United States Patent Office 3,435,126
Patented Mar. 25, 1969

3,435,126
MEANS SECURING A CABLE SHEATH TO A GROUNDING AND SUPPORTING MEMBER
Douglas L. P. Hamilton, % Utility Products Co., 3111 W. Mill Road, Milwaukee, Wis. 53209
Filed Jan. 4, 1967, Ser. No. 607,258
Int. Cl. H02g 15/02, 15/08
U.S. Cl. 174—78                2 Claims

ABSTRACT OF THE DISCLOSURE

Segments of the metal shield of a cable are folded back onto the butt end portion of the plastic cable sheath which has been cut away to expose the conductors of the cable. A metal band with integral inwardly directed sharp pointed prongs is wrapped around the folded-back shield segments. A hose clamp embracing the band enwrapped butt end portion of the cable sheath and a neck portion on a metal grounding and cable supporting member, in an above ground enclosure, is tightened to cause the prongs to penetrate the folded back segments of the metal shield to establish a good electrical connection between the shield and the grounding and supporting member, despite an insulative coating on the surfaces of the shield, both inside and out. The tightening of the hose clamp also mechanically anchors the cable to the grounding and supporting member.

---

This invention relates to terminals for buried cable and has more particular reference to above-ground terminal installations for underground cable of the type employed in utility distribution systems; an example of which appears in my Patent No. 2,916,539, and also in my copending application Ser. No. 607,256, filed Jan. 4, 1967 now abandoned.

Telephone and similar cables for underground installation usually comprise a number of paired conductors within a relatively thick sheath of insulating material such as polyethylene, provided with an inner tubular metal shield. The shield, which is usually made of aluminum having circumferential corrugations that permit flexure of the cable, protects the conductors and also serves as a ground return in the circuits of which the conductors form a part.

At points where service and other connections to the cable must be made, a loop of the cable is brought up into an above ground terminal housing or enclosure; and to enable connections to be made to the conductors of the cable, its sheath and metal shield are stripped from this loop. Cutting away part of the metal shield in this way, of course, produces two butt ends on the cable shield, one at each extremity of the loop, and interrupts the continuity of the ground circuit which the shield provides. It is therefore essential that the severed ends of the metal shield be electrically connected in some way. This can be done by grounding the severed end portions of the metal shield to a part of the housing or enclosure.

As illustrated in my aforesaid copending application, the heretofore preferred way of grounding the cable shield was to cut several longitudinally extending circumferentially spaced slits, usually three, into the butt end portions of the sheath and its inner metal shield. This permitted a thin flexible metal band which was wrapped around the bundle of conductors to be slid down under the segments produced by the slits, with the end portions of the band projecting through one of the slits to provide exposed terminal tabs. The segments of the cable shield and sheath were then tightly wrapped with tape, but without covering the terminal tabs provided by the end portions of the band, to hold the bare inner surface of the shield segments solidly in contact with the band.

To complete the grounding connection, the cable was clamped to an upright metal neck on the base of the housing or enclosure, by means of a metal hose clamp which embraced the neck and the cable at the terminal tabs to electrically connect the tabs with the neck on the base. Clamping the cable to a portion of the enclosure in the manner described, not only grounded the severed ends of the metal shield to the base and through it maintained the needed electrical continuity of the shield, but also mechanically anchored the loop of the cable to the enclosure.

As will be readily appreciated, the aforesaid manner of grounding the cable shield depended upon being able to effect a good metal-to-metal contact between the grounding band and the inner surface of the shield segments; but a recent change in cable construction has made such contact impossible.

Being made of aluminum, the metal shield of the cable was prone to corrosion resulting from condensation of moisture that penetrated the outer sheath through even the tiniest cut made during laying of the cable or by some other, often unknown damage to the cable. To protect the aluminum shield against this objectionable consequence, cable manufacturers have "plated" the shield, both inside and out, with a moisture proof coating, generally polyethylene. This plating, of course, was done before the shield was formed on the cable.

But the improved cable made it impossible to use the conventional method of grounding its metal shield, since the protective coating on the surfaces of the shield was electrically insulating. Another way of grounding the shield had to be found; and this was the objective of the present invention.

The purpose and object of this invention thus resides in the provision of a practical method and means of establishing a good electrical connection between the tubular inner metal shield of a cable and a grounding member to which the cable is mechanically anchored, despite the fact that both the inner and the outer surfaces of the tubular shield have a protective coating of insulation bonded thereto, and to do so in a manner which does not entail removal of any portion of this protective coating.

Briefly described, the method by which the invention achieves its objective comprises: first cutting away or otherwise removing the butt end portion of the outer polyethylene sheath to expose a short length of the metal shield. This end portion of the shield is cut into several segments—usually three—by longitudinally slitting the shield at circumferentially spaced locations. The segments are now folded back, "banana peel" fashion onto the adjacent butt end portion of the sheath. This turns the segments inside out. Next, a flexible metal band having inwardly directed sharp pointed tangs or prongs is wrapped around or partially around the folded back shield segments, and then a hose clamp is applied around the cable and the neck of the grounding member to which the cable is to be anchored and to which the metal shield is to be electrically grounded, with the clamp embracing the flexible pronged metal band. By tightening the hose clamp the sharp tangs or prongs of the band are caused to penetrate the shield segments and enter the underlying butt end portion of the polyethylene sheath. This establishes good metal-to-metal contact between the shield and the pronged band, and through the latter and the encircling hose clamp, electrical continuity to the grounding member is obtained.

In addition to providing a good electrical connection between the metal shield of the cable and the grounding and supporting member, despite the fact that both the inner and outer surfaces of the shield have a protective electrically insulating coating, the interpositioning of the pronged band between the hose clamp and the folded-back segments of the cable shield also secures the cable against downward displacement with respect to the grounding and supporting member. This follows from the penetration of the prongs of the band through the shield and their entry into the underlying portion of the sheath and the fact that the band has an outwardly projecting flange which rests upon the upper edge of the hose clamp.

With the above and other features of this invention in view, which will appear as the description proceeds, reference is now made to the accompanying drawing which illustrates the best mode so far devised for practicing the invention, and in which.

Figure 1:
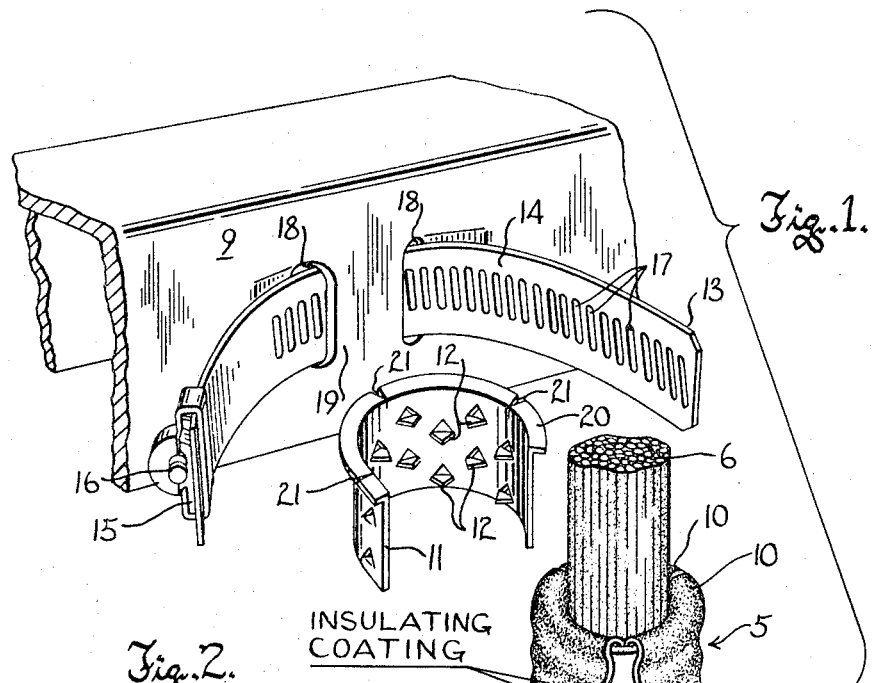
FIGURE 1 is a fragmentary perspective view of one leg of a cable loop, prepared in accordance with the principles of this invention for connection thereof to a part of a terminal enclosure, with its shield grounded thereto, the means for effecting the connection also being shown.
Figure 2:
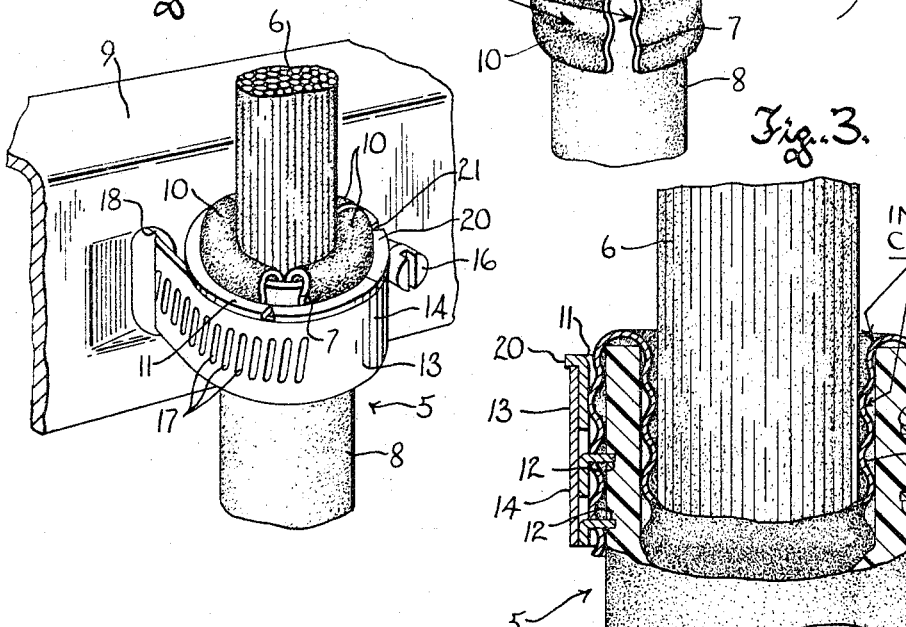
FIGURE 2 is a perspective view of the completed connection.
Figure 3:
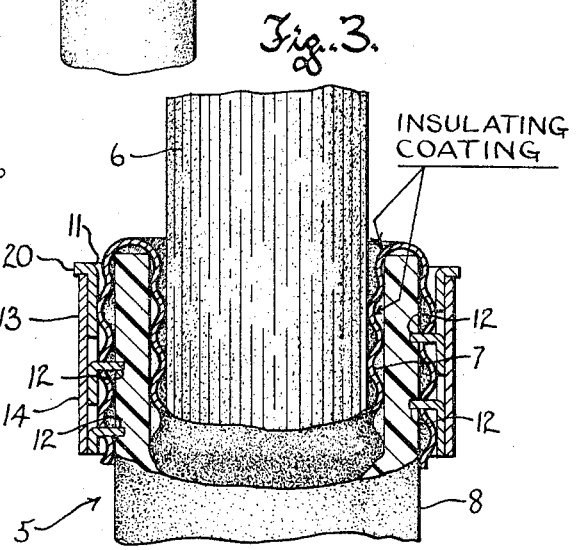
FIGURE 3 is a vertical sectional view of the connection on a larger scale.

In the accompanying drawing, the numeral 5 designates generally a portion of a cable suitable for underground installation, and comprising a plurality or bundle of insulated paired conductors 6 within an inner tubular metal shield 7 and an outer relatively thick sheath 8 of insulating material. Customarily, the sheath 8 is formed of polyethylene, and the metal shield is usually made of aluminum, circumferentially corrugated to permit flexure of the cable. To protect the metal shield of the cable from corrosion by moisture which may enter the sheath and condense, the surfaces of the shield, both inner and outer, are plated with polyethylene or some other suitable corrosion resisting coating, which in any event is electrically insulating.

The cable portion 5 shown may be terminal end of a cable or, as heretofore stated, it may be part of one leg of a loop in the cable that is brought up into a terminal enclosure, not shown, as in my aforesaid patent and pending application, for the purpose of making above ground service connections to its conductors 6. To enable such connections to be made to the conductors, it is of course necessary that the outer sheath 8 and the inner metal shield 7 be removed from part of the cable in the terminal enclosure, usually its looped portion. This exposes the conductors; but it also interrupts the continuity of the metal shield and produces two butt ends on the shield and the sheath, one on each leg of the loop.

The legs of the cable loop are secured to a metal grounding and supporting member 9 which may form part of the terminal enclosure. This grounding and supporting member 9 not only carries the weight of the cable but also has the metal shield 7 electrically connected thereto. Hence, the member 9 provides electrical continuity across the severed ends of the cable shield 7.

In preparing a cable for securement to the grounding and supporting member in accordance with this invention, the butt end portion of the insulating sheath 8 is first cut back to expose the end portion of the metal shield. At least three longitudinally extending slits are then cut into the exposed end portion of the metal shield at substantially equicircumferentially spaced locations.

The shield segments 10 defined by the slits are bent outwardly and downwardly "banana peel" fashion over the butt end of the sheath to closely overlie the exterior of the sheath at the upper end thereof. A flexible metal band 11 having inwardly directed sharply pointed tangs or prongs 12 is then wrapped around the downturned shield segments 10 with the points of its prongs 12 bearing against the shield segments. The thus prepared cable is then clamped to the grounding and supporting member 9 by means of a hose clamp 13, and as the clamp 13 is tightened, the inwardly directed prongs or tangs 12 penetrate through the downturned shield segments 10 and enter the underlying sheath 8. Although the prongs should be long enough to enter the sheath, they should not be so long that they project through the sheath. In penetrating the shield segments, the tangs or prongs make good metal-to-metal contact with the shield segments, and since the hose clamp and the portion of the grounding and supporting member against which the cable is clamped are of metal and in contact with the band 11, a good electrical connection is established between the cable shield and the supporting and grounding member.

The hose clamp 13 may be of the well known type comprising a flexible metal strap 14 having a loop 15 on one end thereof to receive the opposite end of the strap, and a screw 16 mounted on the loop 15 to coact with longitudinally spaced slots 17 in the opposite end portion of the strap, to draw the ends of the strap together.

The grounding and supporting member 9 may be a channel-shaped cross bar, as in my copending application, in which event it has a pair of spaced slots 18 in one flange thereof, to define a neck 19 to which the cable is clamped by tightening the hose clamp—it being understood that the strap of the hose clamp is threaded through the slots 18, as shown in FIGURE 1, before it is brought around the cable.

As will be evident, the penetration of the prongs or tangs 12 through the shield and into the sheath not only provides the desired electrical connection with the cable shield, but also secures the band 11 against endwise displacement with respect to the cable; and to hold the cable against slipping downward with respect to the grounding and supporting member 9, the band 11 has a narrow flange 20 along one edge thereof which projects laterally from the band in the direction opposite to that in which the tangs project and overlies the top edge of the hose clamp. Interruptions 21 at intervals along the length of the flange permit the band 11 to be wrapped around the cable.

From the foregoing description taken with the accompanying drawing, it will be apparent that this invention provides simple, inexpensive and very effective method and means for mechanically securing a cable to a grounding and supporting member and, at the same time, establishing a good electrical connection between the grounding and supporting member and the metal shield of the cable, despite the fact that the surfaces of the shield, both inner and outer, are plated with an insulating corrosion-resisting coating.

It should also be understood that while I have illustrated and described one specific embodiment of this invention, changes and modifications thereof will no doubt suggest themselves. Hence this invention is not limited to the precise form described in the preceding disclosure, but embraces all modifications thereof which come within the scope of the appended claims.

What is claimed as my invention is:

1. A connection between a grounding and supporting member and a cable of the type employed in underground utility distribution systems and which cable comprises a plurality of conductors within an inner tubular metal shield enclosed in an outer relatively thick sheath of insulating material, said connection including
   a neck portion on the grounding and supporting member; and
   a circumferential clamping strap embracing the neck portion and the cable to tightly clamp the cable to the grounding and supporting member;
   and said connection being characterized by means providing an electrical connection between the grounding and supporting member and the metal shield of the cable, comprising:

(A) segments cut from the butt end of the shield resulting from the sheath and shield having been removed from a length of the cable to expose its conductors;

said segments being integral with the shield and being folded back upon the adjacent end portion of the sheath; and (B) a metal band having inwardly directed prongs, interposed between the folded back shield segments and the circumferential clamping strap;

the prongs on said band penetrating through the shield segments and projecting into the underlying portion of the sheath;

and being maintained in said penetrating relationship by the circumferential clamping strap.

2. The connection of claim 1, further characterized by abutment means on the pronged band engaging an edge of the circumferential clamping strap to prevent endwise movement of the cable in one direction relative to the circumferential clamping strap.

References Cited

UNITED STATES PATENTS

| 1,809,064 | 6/1931 | Pearson | 16—108 XR |
| 3,194,877 | 7/1965 | Collier | 174—75.12 XR |
| 3,240,868 | 3/1966 | Ets-Hokin et al. | 174—78 XR |

DARRELL L. CLAY, *Primary Examiner.*

U.S. Cl. X.R.

174—89; 339—95